Figure 1:
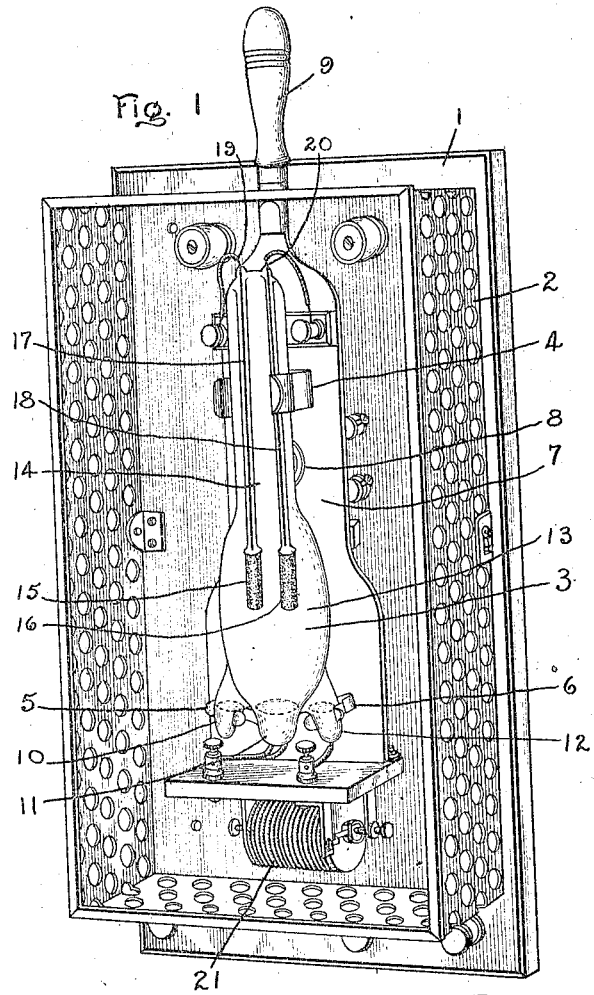

S. FERGUSON.
SYSTEM OF ELECTRICAL DISTRIBUTION.
APPLICATION FILED MAY 16, 1908.

1,102,733.

Patented July 7, 1914
2 SHEETS—SHEET 1.

WITNESSES:

INVENTOR.
SAMUEL FERGUSON.
BY
ATTY.

S. FERGUSON.
SYSTEM OF ELECTRICAL DISTRIBUTION.
APPLICATION FILED MAY 16, 1908.
1,102,733.
Patented July 7, 1914.
2 SHEETS—SHEET 2.
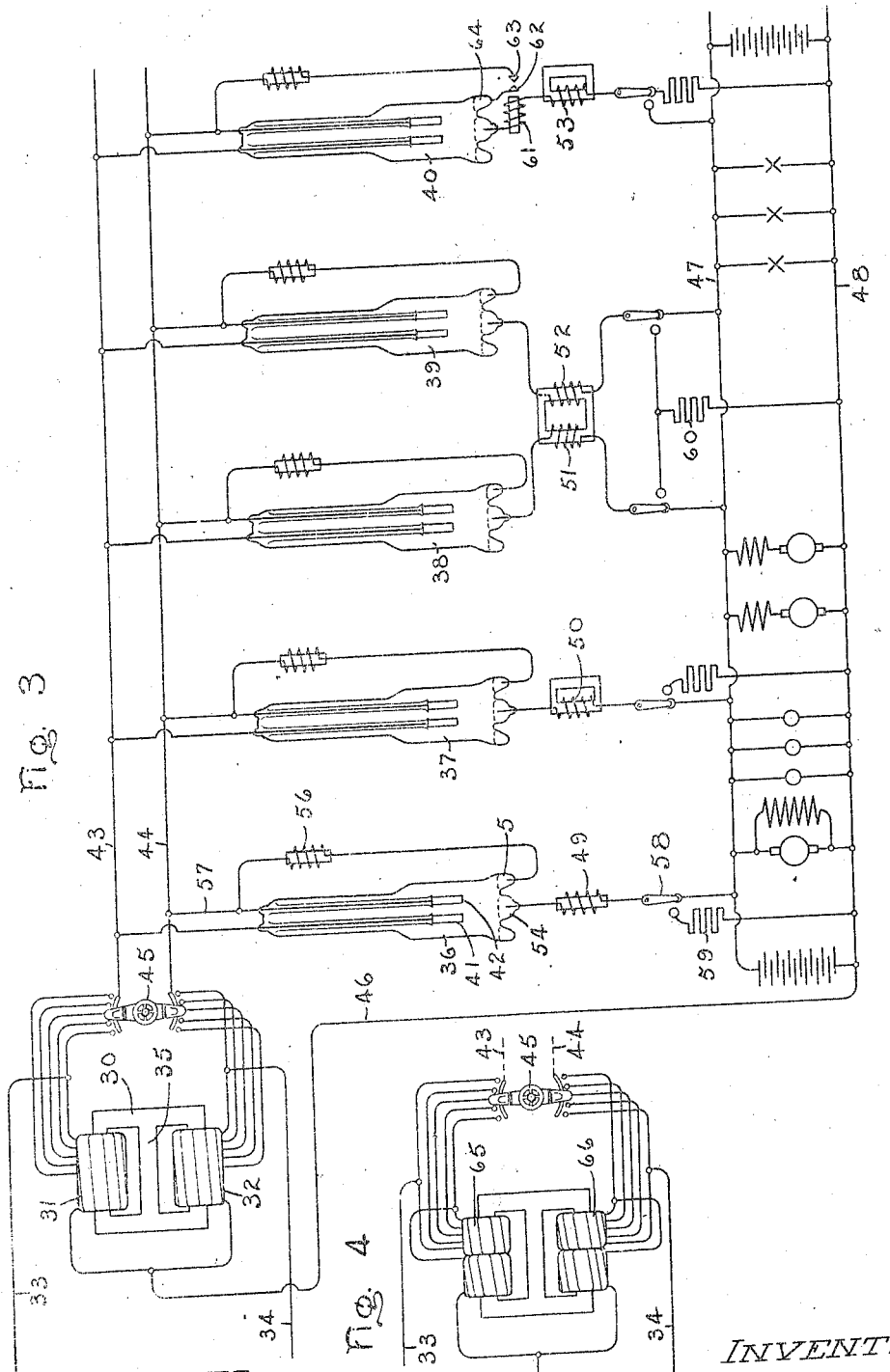
WITNESSES:
INVENTOR
SAMUEL FERGUSON.
BY
ATT'Y.

UNITED STATES PATENT OFFICE.

SAMUEL FERGUSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,102,733.

Specification of Letters Patent.

Patented July 7, 1914.

Original application filed July 13, 1903, Serial No. 165,201. Divided and this application filed May 16, 1908. Serial No. 433,165.

*To all whom it may concern:*

Be it known that I, SAMUEL FERGUSON, a citizen of the United States, residing at Schenectady, county of Schenectady, State of New York, have invented certain new and useful Improvements in Systems of Electrical Distribution, of which the following is a specification.

My invention relates to vapor electric lamps and rectifiers and comprises certain improvements in the construction of the lamp or rectifier together with certain novel means for operating such lamps and rectifiers each in multiple with one or more of its kind.

Attempts to secure multiple operation of vapor rectifiers or lamps have heretofore been unsuccessful in those instances where the alternating current ends of the apparatus were in multiple and the direct current ends also in multiple. In such cases, when a single rectifier for example is in operation, the attempt to throw another rectifier in multiple with it causes the rectifier already in circuit to cease operations as soon as the second rectifier starts. In accordance with my invention I have provided means whereby this trouble is done away with.

In one form of rectifier to which my invention is applicable, inductance coils are used for storing and restoring energy, so as to maintain a continuous flow of current in the rectifier and therefore enable it to operate, and so also as to cause both polarity waves of the alternating current to be rectified instead of waves of one polarity only. In rectifiers of this character, the inductance coils have heretofore been made with separate cores. In accordance with one feature of my invention, a single core for the inductance coils may be used thereby securing various advantages such as economy of space, economy of material, and so forth.

My invention further comprises certain other details both as to the construction of the apparatus and also as to the mode of connecting the same in circuit.

The novel features which I believe are characteristic of my invention I have pointed out with particularity in the appended claims. The invention itself, however, as to its actual construction and mode of operation will be better understood by reference to the following description which is to be taken in connection with the accompanying drawings, in which—

Figure 2:
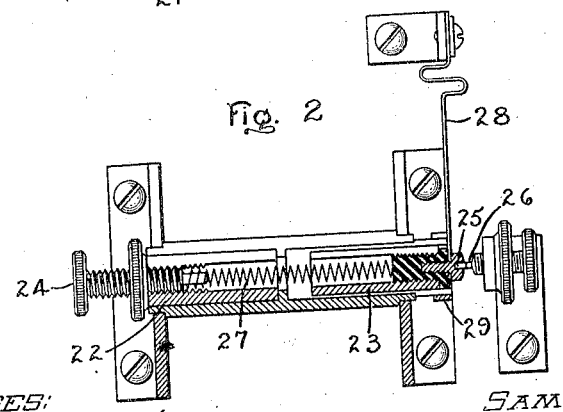

Figure 1 is a perspective view of a single rectifier embodying some of the features of my invention. Fig. 2 is a sectional view of the cut-out forming a part of the apparatus shown in Fig. 1. Fig. 3 represents a system of distribution in which a plurality of rectifiers are operated from a single set of inductance coils and are arranged with their rectified circuits as well as their alternating current terminals in multiple with each other. Fig. 4 is a modification of the arrangement of inductance coils shown in Fig. 3.

In Fig. 1 the rectifier is shown as mounted on a base 1 of slate or other suitable material and provided with a perforated metallic protecting-casing 2 having a glass cover which from its nature cannot be clearly shown in the drawings. The rectifier proper is indicated at 3 and is detachably secured by asbestos-lined clips 4, 5 and 6 to a pivotally-mounted support 7. This support 7 consists of a conveniently shaped metal plate pivoted at 8 to the base 1 and provided with a handle 9 by which it may be rocked about its pivot.

The individual rectifier, except as to a certain feature to be mentioned, is not of my invention and therefore requires no elaborate description. In general the rectifier consists of a highly exhausted envelop of glass or other suitable material. The shape is such as to provide pockets in the bottom portion thereof to contain bodies of mercury 10, 11 and 12, while the upper portion of the envelop is fashioned into a somewhat bulbed shape as at 13 having extending upwardly therefrom a tubular portion 14. Within the bulb 13 are located two electrodes 15 and 16, either solid or hollow, of artificial graphite or other suitable material. These electrodes are supported in position by glass-incased wires 17, 18 connected to leading-in wires 19 and 20. The graphite electrodes 15 and 16 constitute the two main anodes of the rectifier and the large body of mercury 11 the cathode. The mercury electrode 12 is a starting electrode. It may be maintained permanently in circuit or if desired may be automatically cut out when the rectifier starts. If the starting electrode is to be cut out of circuit I may make use of the cut-out indicated at 21 in Fig. 1 in which it is shown as carried by the pivoted plate 7. By mounting the cut-out as shown its weight lends stability to the pivoted member of the rectifier while at the same time its presence in juxtaposition to the rectifier enables the abolition of a number of flexible conductors which would otherwise be necessary to connect the movable member of the rectifier with the cut-out if the latter were secured to the fixed base of the apparatus. The various binding-posts serve the useful purpose of taking the strain off of the leading-in wires of the rectifiers.

The cut-out shown in Fig. 1 in perspective and in cross-section in Fig. 2 is provided, as before mentioned, with the exciting coil 21. The core of the exciting coil or solenoid consists of two parts 22 and 23, the first one fixed but carrying the adjusting screw 24, and the second one movable and carrying a contact point 25 coöperating with an adjustable contact point 26. These two contact points are normally held together by means of a compression-spring 27 which urges apart the two core pieces 22 and 23. The force of the spring is adjusted by the screw 24. Current is conveyed to the movable contact 25 by means of the flexible conductor 28. The cut-out is intended to operate only when the current reaches a certain predetermined value and will remain open when the current is below that value. In furtherance of this end an iron ring 29 surrounds the end of the core 23 when the contacts 25 and 26 are together. The current in the exciting coil therefore must rise to a considerable value before the attraction of the solenoid is such as to withdraw the core from the attractive influence of the iron ring 29 and against the opposing force of the spring 27. When this withdrawal however has once taken place and the core 23 is out of the influence of the iron ring 29, and within proximity to the other portion 22 of the core, a relatively small amount of current suffices to hold the parts in this position, whence it will be seen that the current through the solenoid may decrease largely in amount below that necessary to separate the contacts 25 and 26, before the contacts can again be closed by the action of the spring 27. This allows the cut-out to open the starting circuit only when it is certain that the rectifier has started and causes the starting circuit to close only when the current in the rectifier either ceases entirely or is abnormally small.

In connecting up the rectifier shown in Fig. 1, the two electrodes 15 and 16 are connected respectively to leads extending from a source of alternating current. Across these leads two inductance coils are connected in series and the junction between them connected through a suitable consumption circuit with the main mercury electrode or cathode 11. An additional or starting mercury electrode 12 is connected through a resistance or inductance to one of the alternating current leads. By causing the mercury of the two electrodes 11 and 12 to flow together and then separate, as by rocking the rectifier on its support as indicated in Fig. 1, a circuit is established which, as the mercury separates, starts an arc which in turn causes arcs to start between the main mercury electrode 11 and the two upper electrodes 15 and 16. The starting electrode 12 having thus served its function may be cut out of circuit by means of the cut-out 21 if so desired. Inasmuch, however, as the resistance in circuit with the starting electrode permits only a small current to flow, the electrode may remain in circuit without other disadvantage than the slight loss of energy in the resistance.

Rectifiers of the character above described have heretofore been provided with separate reactances, but as shown in Fig. 3 these reactances may, if desired, be arranged with their windings on the same core. This core, which I have indicated at 30, is provided with three parallel legs connected by end pieces. On the outer legs are mounted the windings 31 and 32 which are connected in series with each other across the alternating current supply mains 33 and 34. The connections are such that the middle leg 35 of the core forms a return magnetic circuit for the fluxes developed by the two coils. Any number of rectifiers, within the capacity of the inductance coils, may be fed by coöperative connections to the inductance coils. If the rectified current from each rectifier has a separate circuit of its own no special precautions are necessary, but if it is desired that the rectifiers should be connected in multiple on their direct current sides to a common load, then I have found that special precautions must be taken, as will now be pointed out. By way of illustration, Fig. 3 shows a number of rectifiers connected in multiple to the same load. Thus for example, of the five rectifiers shown, each consists of an exhausted envelop as indicated at 36 to 40 inclusive, which envelop is or may be of substantially the same form as that shown in Fig. 1 and, like the arrangement shown in this figure, provided with electrodes and otherwise of similar construction. In connecting up the rectifiers the two upper electrodes, as for example 41 and 42 of the rectifier 36, may be connected directly to the supply mains 33 and 34. I have found, however, that in case the voltage of the supply main is not of exactly the value to give the desired direct current voltage in the rectified circuit, the inductance coils 31 and 32 may perform the dual function of varying the voltage on the rectifier and of storing and restoring energy to maintain the rectifier in its characteristic mode of operation, the nature of which latter function it is unnecessary for me to enter into inasmuch as the rectifier, in its broader aspects, is not of my invention. For the purpose then of conveniently varying the alternating voltage on the rectifier bus-bars or conductors 43 and 44, I may connect these conductors by means of a switching device 45 which operates, as will be evident by an inspection of the drawings, to shift the connections of the conductors 43 simultaneously along corresponding points in the windings of the inductance coils 31 and 32 toward or away from the terminals connected to the main supply leads 33 and 34. The connection is similar to a compensator with voltage adjusting taps.

Each of the rectifiers 37 to 40 inclusive is connected to the bus-bars 43 and 44 in the same way as the rectifier 36. The main mercury electrode of each of the rectifiers is connected through a consumption circuit to a lead 46 extending to the junction between the two inductance coils 31 and 32. Each of the rectifiers may as before mentioned have its own consumption circuit but if on the other hand it is desired that the rectifiers should supply a common load, as for example that represented by the various translating devices comprised between the conductors 47 and 48, then the connection of each of the main mercury electrodes of the rectifiers must be made to the load through what I may term a steadying device which may consist of an inductance or a resistance. In Fig. 3, however, I have represented the respective rectifiers as provided with steadying devices consisting of reactances 49 to 53 respectively, rather than resistances. The reactance 49 is indicated for example as having an open magnetic circuit, while the other reactances are provided with cores having closed magnetic circuits.

In starting into operation the system shown in Fig. 3 the rectifiers may be started one after the other. A description of the starting of one will therefore suffice for all. Referring more particularly to the rectifier 36 it will be noted that at the bottom portion of the envelop are two mercury electrodes 54 and 55 to correspond respectively to the electrodes 11 and 12 in Fig. 1. The electrode 54 is the main electrode from which the rectified current is derived and is connected directly to the circuit including the steadying device 49. The additional or starting electrode 55 is connected through a resistance or inductance 56 to one of the alternating current supply leads as for example the lead 57. In starting the rectifier the switch 58 is thrown so as to connect the direct current circuit of the rectifier through a starting resistance 59 to the lead 46 extending back to the inductance coils 31 and 32. When the starting arc in the rectifier is sprung by rocking the rectifier, or otherwise bringing the mercury of the two electrodes 54 and 55 into momentary contact, the main arcs between the electrodes 54 and the two upper electrodes 41 and 42 immediately follow and the rectifier is in operation. When this is done the switch 58 may be thrown into the position indicated in Fig. 3 thereby connecting the rectifier directly across the circuit of the load. This operation may, however, be deferred until all of the rectifiers have been started into operation through their respective starting resistances. In the case of the rectifiers 38 and 39, a common starting resistance 60 is used to start both rectifiers. If desired, a single starting resistance might be used for starting the entire set of rectifiers, one after the other.

In connection with the description of the rectifier 36, it has been assumed that the starting circuit including the resistance 56 remains closed during the operation of the rectifier. The current in the starting circuit is unidirectional and, inasmuch as it flows through the load, is not lost. There is, however, a certain though not considerable loss of energy in the resistance 56. To do away with this the cut-out heretofore described may be used, as diagrammatically indicated for example in connection with the rectifier 40. In this case the winding 61 of the cut-out, which corresponds to the winding 21 in Fig. 1, is connected in the direct current circuit of the rectifier and operates to separate the two contacts 62 and 63 in the circuit of the starting electrode. These contacts 62 and 63 correspond to the contacts 25 and 26 in Fig. 2 while the starting electrode 64 in Fig. 3 corresponds to the starting electrode 12 in Fig. 1. The connections of the cut-out just described, represent the connections of the cut-out which is shown in detail views in Figs. 1 and 2.

In Fig. 3 the taps in the windings of the inductance coils 31 and 32 are so brought out and the connections to the supply mains 33 and 34 and the rectifier bus-bars 43 and 44 so made that the voltage on the bus-bars may be made equal to or less than that on the supply mains 33 and 34. If it is desired to make the voltage on the bus-bars greater than that on the supply mains, or in other words to step up the voltage, then the connections may be altered as shown in Fig. 4, which differs from the corresponding portion of Fig. 3 in that a portion of each inductance coil, as at 65 and 66 is reversed with respect to the remainder of the inductance coils while the connections to the supply mains 33 and 34 are made so as to include all the coils in series. When the switch 45 is placed so as to connect the bus-bars 43 and 44 to the supply mains 33 and 34, the voltage is the same on the two sets of mains. When, however, the switch is turned so as to move the leads or bus-bars 43 and 44 farther from the main lines 33 and 34 thus inserting one or more of the coil sections 65 and 66 between the mains and the rectifier circuit, the voltage on the rectifier will be increased above that of the mains according to the number of sections so inserted, the voltage of each being added to that of the source of supply.

In the foregoing description I have set forth in detail various embodiments which my invention may assume in practice. It is to be understood, however, that many variations thereof may be made without departing from the spirit of my invention, for which reason I do not wish to be limited to the exact details shown and described.

This case is a division of my application, Serial No. 165,201, filed July 13, 1903.

What I claim as new and desire to secure by Letters Patent of the United States, is,—

1. The combination of a base-plate or member, a support pivoted thereto, a handle for rocking said support, and a vapor conductor carried by said support.

2. The combination of a base-plate or member, a support pivoted thereto, a handle for rocking said support, a vapor conductor carried by said support, and a cut-out also carried by said support.

3. The combination of a base-plate or member, a support pivoted thereto, a handle for rocking said support, a vapor conductor carried by said support, and a cut-out also carried by said support and located below the pivotal point of said support.

4. The combination of a pivoted support, a vapor conductor carried thereby, binding posts carried by said support, and leads extending from said binding posts to said vapor conductor.

5. The combination with a vapor electric device, of a frame upon which the same is mounted, a standard, a pivotal connection between the standard and the back of the frame, the said pivotal connection permitting a radial motion of the frame on the said standard.

6. In an electrical system, a gas or vapor electrical device, a tilting frame in which the said device is mounted, electrodes in said device, and means whereby the said frame can be tilted in one direction for supplying an excess of electrode material to one of the electrodes, and in the other direction for creating a conducting stream of electrode material between the two electrodes.

In witness whereof, I have hereunto set my hand this 11th day of May, 1908.

SAMUEL FERGUSON.

Witnesses:
BENJAMIN B. HULL,
HELEN ORFORD.